United States Patent
Chang et al.

(10) Patent No.: US 7,248,441 B2
(45) Date of Patent: Jul. 24, 2007

(54) DISK DRIVE ACTUATOR PARKING METHOD USING IMPACT REBOUND CRASH STOP WITH BIAS TAB AND PUSHER AND CRASH STOP FACES

(75) Inventors: Joseph Chang, Cupertino, CA (US);
Ron Kirkish, Campbell, CA (US);
Vinod Sharma, San Jose, CA (US);
Frank I. Morris, San Jose, CA (US);
Bipin V. Gami, San Jose, CA (US)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 0 days.

(21) Appl. No.: 10/880,063

(22) Filed: Jun. 28, 2004

(65) Prior Publication Data
US 2004/0240117 A1   Dec. 2, 2004

Related U.S. Application Data (62) Division of application No. 10/117,518, filed on Apr. 4, 2002, now Pat. No. 6,967,822.

(51) Int. Cl.
G11B 5/54 (2006.01)
G11B 21/22 (2006.01)

(52) U.S. Cl. .................... 360/265.1; 360/256.2
(58) Field of Classification Search ............. 360/256.2, 360/256.4, 254.7, 256, 254.3, 265.1
See application file for complete search history.

(56) References Cited

U.S. PATENT DOCUMENTS

| | | |
|---|---|---|
| 4,536,867 A | 8/1985 | Robinson |
| 4,577,756 A | 3/1986 | Hennessy et al. |
| 4,879,617 A | 11/1989 | Sampietro et al. |
| 5,216,662 A | 6/1993 | Stefansky et al. |
| 5,262,912 A | 11/1993 | Hudson et al. |
| 5,291,359 A | 3/1994 | Wolter |
| 5,299,081 A | 3/1994 | Hatch et al. |
| 5,305,169 A | 4/1994 | Anderson et al. |
| 5,363,261 A | 11/1994 | Eckberg et al. |
| 5,369,538 A | 11/1994 | Moe et al. |
| 5,455,728 A | 10/1995 | Edwards et al. |
| 5,715,119 A | 2/1998 | Williams et al. |
| 5,734,527 A | 3/1998 | Reinhart |
| 5,745,319 A | 4/1998 | Takekado et al. |
| 5,768,058 A | 6/1998 | Hofland |
| 5,793,572 A | 8/1998 | Lalouette et al. |

(Continued)

FOREIGN PATENT DOCUMENTS

EP   0 380 256   8/1990

(Continued)

*Primary Examiner*—Craig A. Renner
(74) *Attorney, Agent, or Firm*—Earle Jennings; GSS Law Group (57) ABSTRACT

The invention includes an impact rebound crash stop pivoting about a pivot between the top and bottom yoke of an actuator magnet assembly. The impact rebound crash stop includes a latch bias tab magnetically attracted to the voice coil magnet when it is near. The invention further includes a proximity latch allowing the actuator to stay on the ramp when not in use. The invention includes the operation of actuator arms embedding part of the magnetic proximity latch, actuators, and disk drives using the crash stop and proximity latch.

6 Claims, 7 Drawing Sheets

U.S. PATENT DOCUMENTS

| | | |
|---|---|---|
| 5,812,346 A | 9/1998 | Williams et al. |
| 5,870,256 A | 2/1999 | Khanna et al. |
| 5,875,075 A | 2/1999 | Hickox |
| 5,880,904 A | 3/1999 | Mizoshita et al. |
| 5,982,587 A | 11/1999 | Alagheband et al. |
| 6,028,745 A | 2/2000 | Nguyen et al. |
| 6,091,587 A | 7/2000 | Hatch et al. |
| 6,134,077 A | 10/2000 | Misso et al. |
| 6,163,440 A | 12/2000 | Takahashi et al. |
| 6,185,074 B1 | 2/2001 | Wang et al. |
| 6,381,103 B1* | 4/2002 | Misso et al. ............ 360/256.2 |
| 6,507,461 B1 | 1/2003 | Kimura et al. |
| 6,535,357 B1* | 3/2003 | Misso et al. ............ 360/256.2 |
| 6,535,358 B1 | 3/2003 | Hauert et al. |
| 6,542,335 B1 | 4/2003 | Misso et al. |
| 6,731,468 B2 | 5/2004 | Williams et al. |
| 2002/0135944 A1* | 9/2002 | Misso ....................... 360/256 |
| 2003/0035246 A1 | 2/2003 | Byun et al. |

FOREIGN PATENT DOCUMENTS

| | | |
|---|---|---|
| JP | 05067380 A | 3/1993 |
| JP | 07073620 A | 3/1995 |
| JP | 10320418 A | 11/1998 |
| WO | WO 93/19460 | 9/1993 |
| WO | WO 96/10249 A1 | 4/1996 |
| WO | WO 00/51126 | 8/2000 |

\* cited by examiner

DISK DRIVE ACTUATOR PARKING METHOD USING IMPACT REBOUND CRASH STOP WITH BIAS TAB AND PUSHER AND CRASH STOP FACES

CROSS REFERENCE TO RELATED APPLICATIONS

This is a divisional application of U.S. patent application Ser. No. 10/117,518, filed Apr. 4, 2002 now U.S. Pat. No. 6,967,822, entitled: A Proximity Latch Mechanism Using an Impact Rebound Crash Stop for an Outside Disk Ramp Loading Disk Drive.

TECHNICAL FIELD

This invention relates to latch mechanisms used in parking read-write heads outside the disk media surface(s).

BACKGROUND ART

Disk drives are an important data storage technology based on several crucial components including disk media surfaces and read-write heads. When in operation, rotation of disk media surfaces, with respect to the read-write heads, causes each read-write head to float a small distance off the disk media surface it accesses. However, for a variety of reasons, disk media surfaces frequently stop rotating when not in operation for awhile.

When the disk media surface is not rotating with respect to the read-write head, mechanical vibrations acting upon the disk drive can cause the read-write head to collide with the disk media surface, unless they are separated.

This separation is often referred to as "parking" the read-write heads. Parking the read-write heads minimizes the possibility of damaging the disk media surfaces and/or the read-write heads due to these mechanical collisions. Often such parking mechanisms include a ramp on which the head slider(s) are "parked" and a latch mechanism. The purpose of the latch mechanism is to minimize the chance that the actuator will accidentally leave the parking ramp outside the disk media surface and potentially damage the disk media surface(s).

Figure 1A:
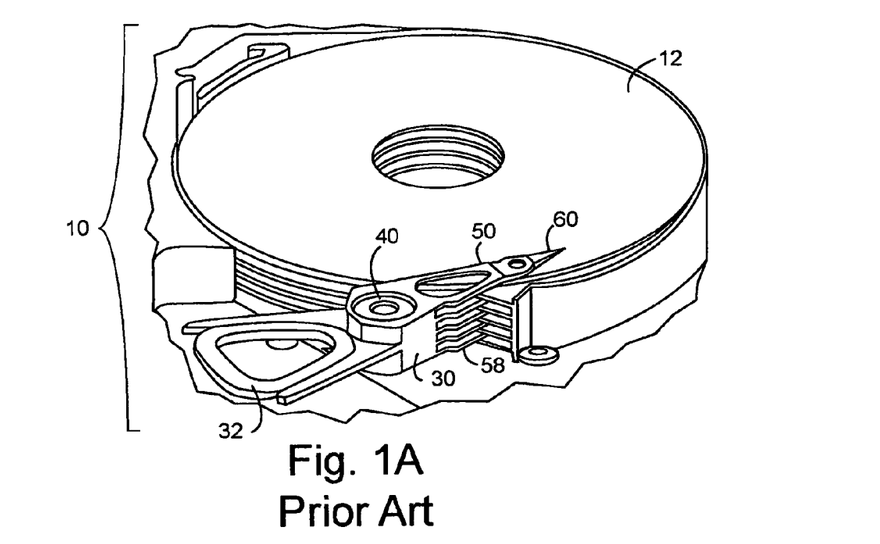
FIG. 1A illustrates a typical prior art high capacity disk drive 10 including actuator arm 30 with voice coil 32, actuator axis 40, suspension or head arms 50-58 with slider/head unit 60 placed among the disks.

FIG. 1A illustrates a typical prior art high capacity disk drive 10 including actuator arm 30 with voice coil 32, actuator axis 40, suspension or head arms 50-58 with slider/head unit 60 placed among the disks.

Figure 1B:
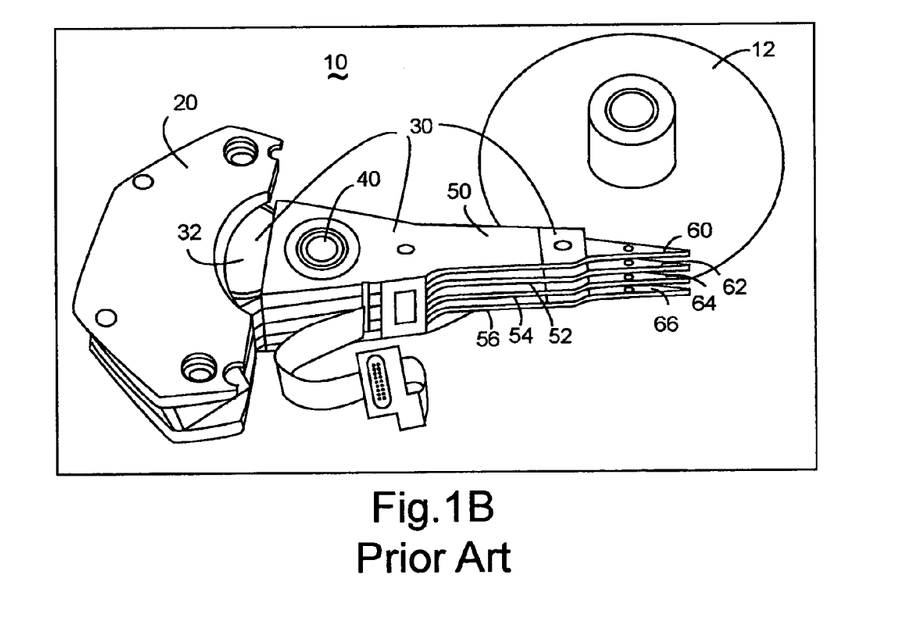
FIG. 1B illustrates a typical prior art high capacity disk drive 10 with actuator 20, actuator arm 30 with voice coil 32, actuator axis 40, head arms 50-56 and slider/head units 60-66 with the disks removed.

FIG. 1B illustrates a typical prior art high capacity disk drive 10 with actuator 20, actuator arm 30 with voice coil 32, actuator axis 40, head arms 50-56 and slider/head units 60-66 with the disks removed.

Since the 1980's, high capacity disk drives 10 have used voice coil actuators 20-66 to position their read/write heads over specific tracks. The beads are mounted on bead sliders 60-66, which float a small distance off the disk drive surface 12 when in operation. Often there is one head per head slider for a given disk drive surface. There are usually multiple heads in a single disk drive, but for economic reasons, usually only one voice coil actuator.

Voice coil actuators are further composed of a fixed magnet actuator 20 interacting with a time varying electromagnetic field induced by voice coil 32 to provide a lever action via actuator axis 40. The lever action acts to move head arms 50-56 positioning head slider units 60-66 over specific tracks with remarkable speed and accuracy. Actuator arms 30 are often considered to include voice coil 32, actuator axis 40, head arms 50-56 and head sliders 60-66.

Note that actuator arms 30 may have as few as a single head arm 50. Note also that a single head arm 52 may connect with two head sliders 62 and 64.

While there are many forms of mechanical impact upon a disk drive, only rotary shock in actuator 30's plane of motion can bring the read-write heads into collision with disk media surfaces once the read-write heads are parked. These rotary shocks will be described herein based upon a view defining clockwise and counterclockwise rotations with respect to the disk drive base, with a parking zone located to the right of the disk media surfaces as viewed from above the disk base. As will be apparent to one of skill in the art, it is just as possible for a disk drive to use a parking zone on the left of the disk media surfaces. While this is most certainly possible, the discussion hereafter will focus on a parking zone to the right to clarify the discussion. Such a clarification is not meant to limit the scope of the claims.

Figure 1C:
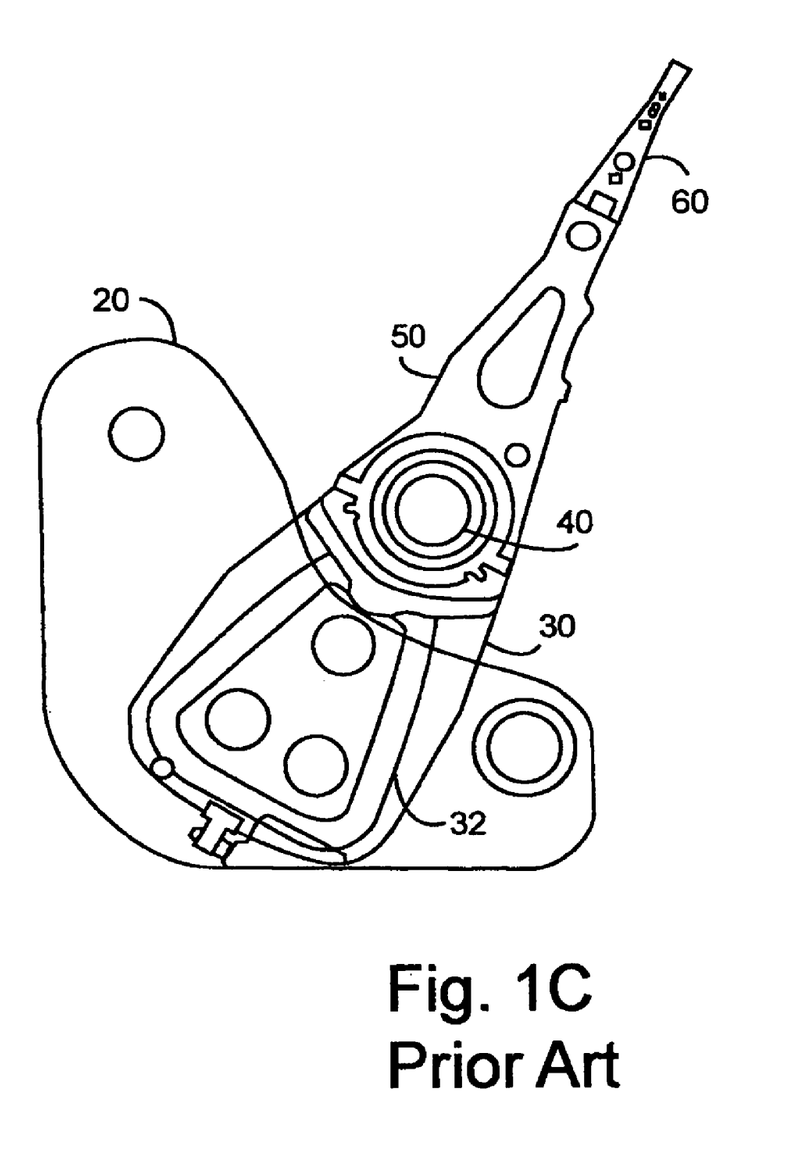
FIG. 1C illustrates a magnetic latch affixed to an actuator arm 30 of the prior art.

FIG. 1C illustrates a magnetic latch affixed to an actuator arm 30 of the prior art.

A magnet is affixed to the tail end of the voice coil 32 region, which when near a second magnet located in either the top yoke or bottom yoke of the fixed magnet region 20, will tend to attract actuator 30 to a parking site often inside the disk media. Magnetic latches are used with Crash Start Stop (CSS) designs.

While they have been put into production in several circumstances, they place additional requirements on the voice coil actuators. This kind of latch requires additional actuator torque to exit from the parking zone. Further, these latches require sophisticated actuator speed control. Inside disk parking zones also tend to heat the read-write heads more. The read-write heads tend to suffer more frequent mechanical collisions with the disk surface.

The outside disk surface approach to parking read-write heads parks the read-write head or heads on a ramp outside the disk surface, removing and/or minimizing the possibility for contact when the disk is not in operation. Latch mechanisms provide at least some assurance that the actuator will remain parked with head sliders on the ramp even after mechanical shocks to the disk drive.

Figure 2A:
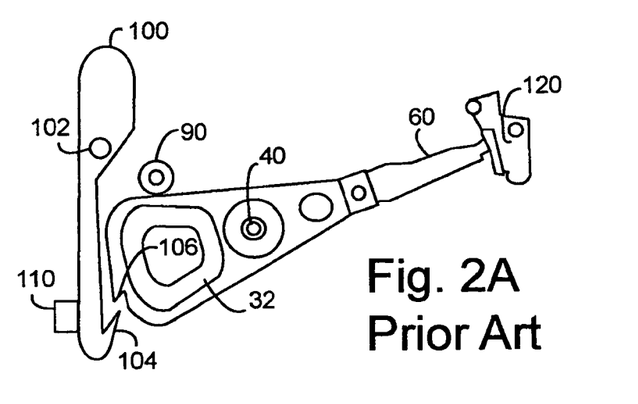
FIG. 2A illustrates the prior art single level inertial latch mechanism including latch arm 100 pivoting about 102 and including latch hook 104, mechanically fitting with actuator catch mechanism 106, as well as latch stop 110, and crash stop 90, with the latch mechanism at rest.
Figure 2B:
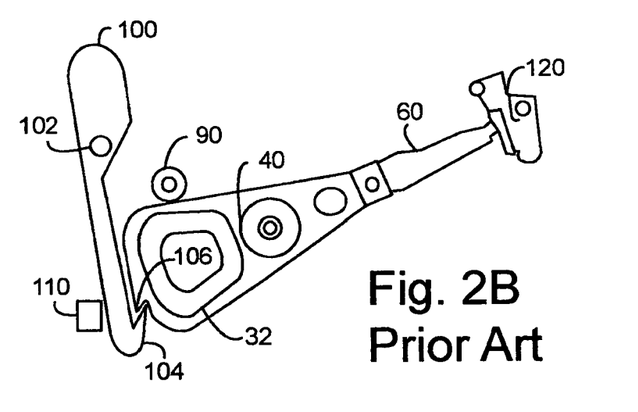
FIG. 2B illustrates the prior art single level inertial latch during a clockwise acceleration of actuator 30.
Figure 2C:
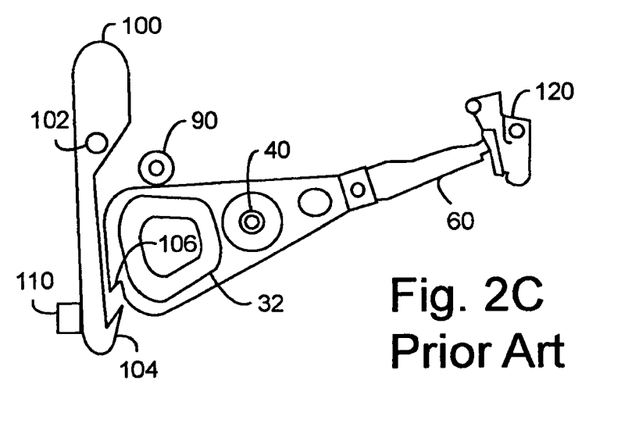
FIG. 2C illustrates the prior art single level inertial latch during a counterclockwise acceleration of the actuator.

FIGS. 2A to 2C illustrate the operation of a single lever inertial latch as found in the prior art.

FIG. 2A illustrates the prior art single level inertial latch mechanism including latch arm 100 pivoting about 102 and including latch hook 104, mechanically fitting with actuator catch mechanism 106, as well as latch stop 110, and crash stop 90, with the latch mechanism at rest.

Note that actuator 30 abuts crash stop 90 and that inertial latch arm 100 abuts latch stop 110 when the single-lever inertial latch is at rest. Slider 60 is in position on parking ramp 120.

FIG. 2B illustrates the prior art single level inertial latch during a clockwise acceleration of actuator 30.

In a clockwise acceleration, actuator 30 moves away from crash stop 90 and actuator catch mechanism 106 engages with inertial latch catch mechanism 104.

FIG. 2C illustrates the prior art single level inertial latch during a counterclockwise acceleration of the actuator.

In a counterclockwise acceleration, the latch may fail if the actuator 30 rebounds from its crush atop 90.

Figure 3A:
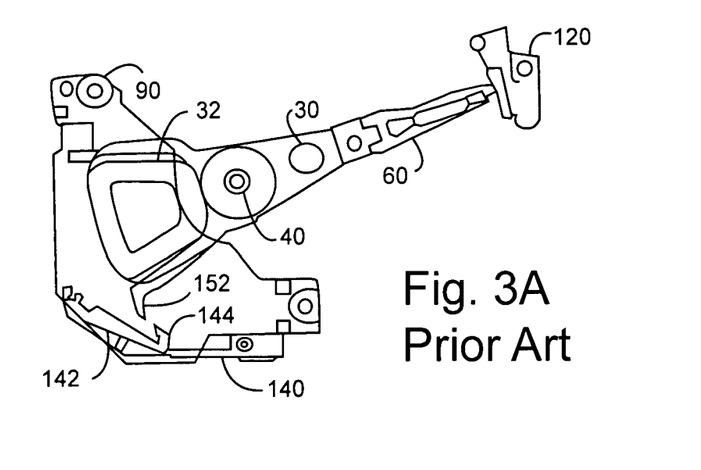
FIG. 3A illustrates a prior art example of a dual-lever inertial latch at rest.

FIG. 3A illustrates a prior art example of a dual-lever inertial latch at rest.

When at rest, a magnet or spring, (which are not shown), biases the small latch arm 142 clockwise, holding the latch 144-152 open.

Figure 3B:
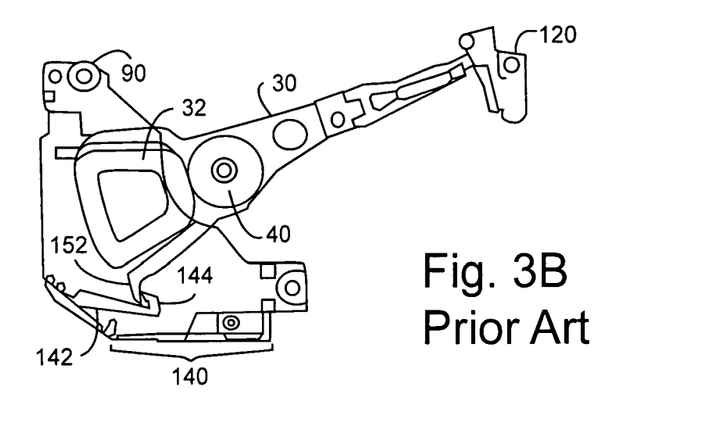
FIG. 3B illustrates a prior art example of a dual-lever inertial latch during a clockwise rotational acceleration of actuator 30.

FIG. 3B illustrates a prior art example of a dual-lever inertial latch during a clockwise rotational acceleration of actuator 30.

Figure 3C:
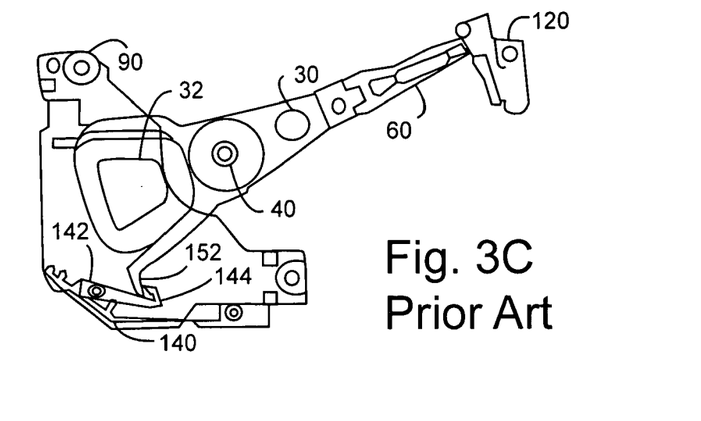
FIG. 3C illustrates a prior art example of a dual-lever inertial latch during a counterclockwise rotational acceleration of actuator 30.

FIG. 3C illustrates a prior art example of a dual-lever inertial latch during a counterclockwise rotational acceleration of actuator 30.

The large latch arm 140 rotates in opposite directions during the clockwise and counterclockwise motions of actuator arm 30 of FIGS. 3B and 3C, respectively. Motion of large latch arm 140 in either direction causes the small arm 142 to rotate counterclockwise to the close position. This dual lever action prevents a rebound of actuator arm 30 off the crash stop 90 from escaping the latched condition.

SUMMARY OF THE INVENTION

The invention includes an impact rebound crash stop pivoting about a pivot 218 between the top and bottom yoke of an actuator magnet assembly 20. The impact rebound crash stop includes a latch bias tab 210 magnetically attracted to the voice coil magnet when near. The magnet attraction rigidly moves a crash stop 216 about pivot 218. This motion engages the crash stop 216 with crash atop site 226, as well as pusher 212 with pusher site 224. Pusher site 224 and crash stop site 226 are both on the actuator 30 fantail.

The impact rebound crash stop uses an impact rebound bi-directional inertial latch and is preferably made of at least one plastic with low elastic coefficient and a magnetically attractive latch bias tab 210. The plastic is preferably essentially rigid.

The invention further includes a proximity latch for an outside disk, ramp loading disk drive allowing the actuator to stay on the ramp when not in use. The proximity latch includes two small magnets 220 bonded to the top and bottom yoke of the voice coil magnet assembly 20 and the impact rebound crash stop.

The proximity latch mechanism attracts a magnetically attractive component molded into the actuator fantail. The attraction is toward the crash stop. The two magnets and magnetically attractive component attract each other, but do not make contact.

The proximity latch, together with the impact rebound crash stop, provide an outside disk ramp loading disk drive with a very reliable, non-contact break free latch while maintaining a high resistance to accidental latch release during rotary shock conditions. The proximity latch mechanism achieves this without using any inertial latch mechanism, eliminating the extra travel allowance required by an impact rebound inertial latch mechanism.

The invention includes the actuator arm 30 embedding the magnetically attractive component 222 in the actuator fantail. The invention further includes an actuator 20-66 containing the proximity latch mechanism with the magnetically attractive component 222 and pusher stop 214 in the actuator fantail and crash stop 210-218 mounted through its pivot 218 to the top yoke 22 and bottom yoke 24 of the actuator magnet assembly 20.

The invention includes the making of these actuators with their crash stop and proximity latch mechanisms, as well as the making of disk drives using these actuators, and the disk drives themselves.

The invention includes the method of parking an actuator through the operation of an internal crash stop and the operation of the internal proximity latch. The invention also includes the method of parking a disk drive using the method of parking the actuator.

These and other advantages of the present invention will become apparent upon reading the following detailed descriptions and studying the various figures of the drawings.

DETAILED DESCRIPTION OF THE INVENTION

A proximity latch for an outside disk ramp loading disk drives allows the actuator to stay on the ramp when not in use (see FIGS. 5A to 6B).

Figure 4:
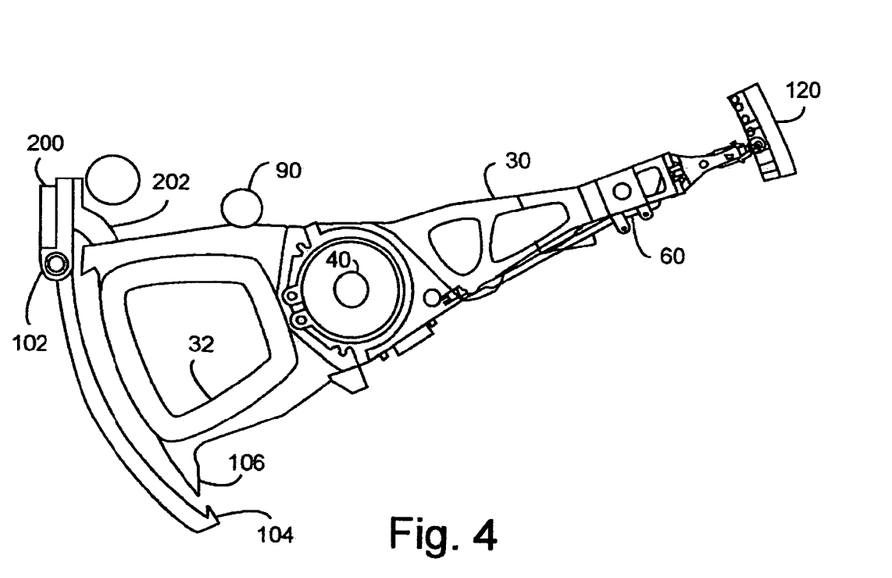
FIG. 4 illustrates an impact rebound type bi-directional inertial latch.

FIG. 4 illustrates an impact rebound type bi-directional inertial latch.

The inertial latch rests in an open position due to a light bias torque applied by the magnetic attraction between the voice coil 32 magnet and the balance steel 200 when there is no externally induced rotational acceleration acting upon actuator arm 30.

Actuator arm 30 and the latch assembly 102-104-202 are rotationally balanced. During clockwise rotational acceleration of the disk drive, the latch 102-104 rotates in the counterclockwise direction with respect to the base. This latch motion causes the latch hook 104 to engage the barb 106 on the actuator 30 tail.

During counterclockwise rotational acceleration of the disk drive, actuator arm 30 rebounds from its crash stop 90 and the latch 202-102-104 also rebounds in the clockwise direction with respect to the base, due to the actuator tail touching the rebound part 202 of the latch. This latch motion causes the latch hook 104 to engage the barb 104 on the actuator 30 tail.

Figure 5A:
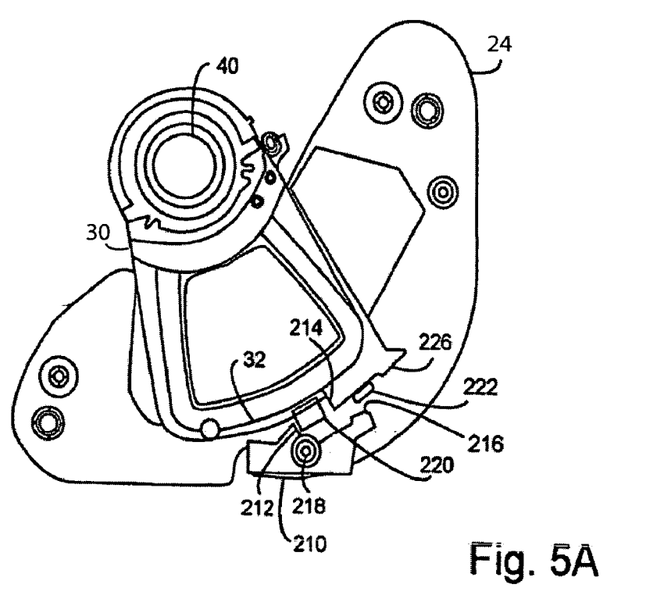
FIG. 5A illustrates the proximity latch mechanism in the open position.

FIG. 5A illustrates the proximity latch mechanism in the open position.

Figure 5B:
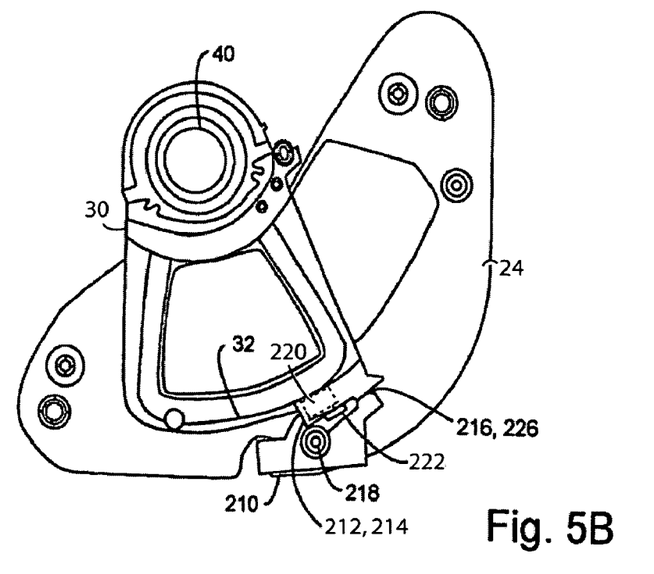
FIG. 5B illustrates the proximity latch mechanism in the closed position.

FIG. 5B illustrates the proximity latch mechanism in the closed position.

Figure 6A:
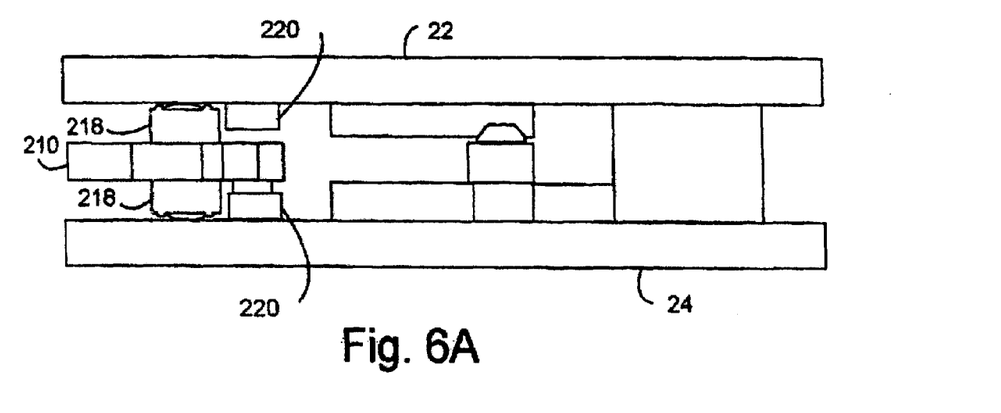
FIG. 6A illustrates a side view of the proximity latch mechanism as housed in the voice coil magnet assembly.

FIG. 6A illustrates a side view of the proximity latch mechanism as housed in the voice coil magnet assembly.

Figure 6B:
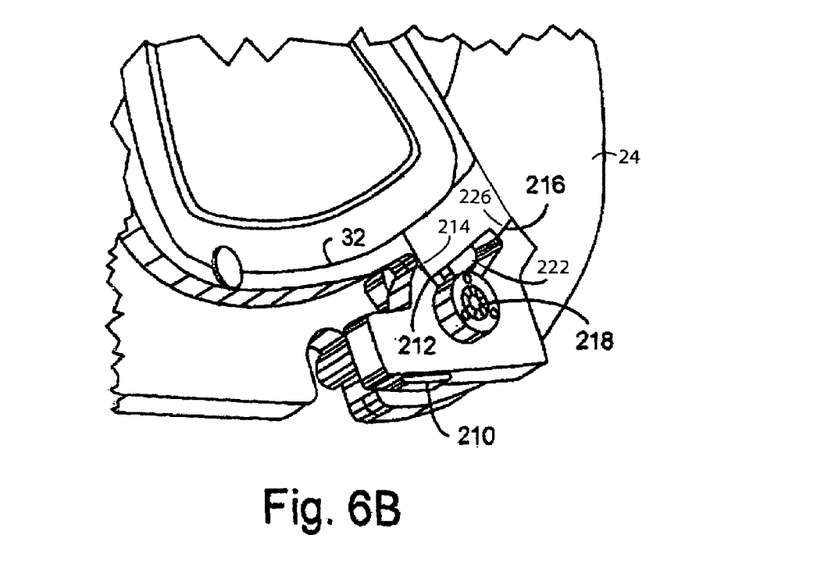
FIG. 6B illustrates a perspective view of the proximity latch mechanism.

FIG. 6B illustrates a perspective view of the proximity latch mechanism.

The proximity latch includes two small magnets 220 bonded to the top yoke 22 and bottom yoke 24 of the actuator assembly 20 and an impact rebound crash stop 216. The impact rebound crash stop 216 uses an impact rebound bi-directional inertial latch 210-218. The impact rebound bi-directional latch includes pusher 212, latch pivot 218 and latch bias tab 210.

The proximity latch mechanism attracts a magnetically attractive component 222 molded into the actuator fantail toward the two small magnets 220. The actuator fantail is further formed of a pusher stop 214 and a crash stop site 226. The attraction is toward the pusher 212. Note that the small magnets 220 are preferably magnetically aligned so that their North poles point in essentially the same direction.

The two small magnets 220 and magnetically attractive component 222 attract each other, but do not make contact. However, as the two small magnets 220 and the magnetically attractive component 222 approach each other, pusher stop 214 engages pusher 212, rotating the proximity latch mechanism 210-218 about latch pivot 218 to engage crash stop 216 and crash stop site 226.

The magnetically attractive component 222 is preferably made of a magnetically attractive form of steel, preferably number 430.

Note that the proximity latch mechanism illustrated in FIGS. 5A and 5B does not use an impact rebound inertial latching mechanism. This eliminates the extra travel allowance required in all the designs illustrated by FIGS. 1C to 4.

The impact rebound crash stop 216 halts the actuator 30 at a contact point illustrated in FIG. 5B through engagement with crash stop site 226 on actuator arm 30.

The magnetic force between the magnetically attractive actuator component 222 and the two non-contact magnets 220, provide a torque upon the actuator. This magnetic force is preferably between 4.8 and 6.0 Newton-meterA2. This preferred magnetic force supports high rotary shock performance in the clockwise direction. The impact rebound crash stop 216 is used to keep the actuator 30 from rebounding during counterclockwise rotary shocks. The impact rebound crash stop site 226 is built into the voice coil magnet assembly as shown in FIG. 6B.

When the actuator approaches the impact rebound crash stop, the magnetic latching mechanism engages and helps the actuator to move faster into the crash stop. The magnetic latching mechanism includes the magnetic attraction between the two small magnets and magnetically attractive component molded into the actuator. The two small magnets are placed on the top and bottom yokes of the voice coil magnet assembly exactly so that the actuator is maintained at a parking "home" where the impact rebound crash stop is located. As the magnetically attractive component of the actuator slowly approaches the flux generated by these two small magnets, the actuator pushes upon the impact rebound crash stop. The impact rebound crash stop is rotated clockwise until the impact rebound crash stop touches the actuator by its latch arm at the crash stop.

The proximity latch mechanism helps a disk drive resist relatively high rotary shock in the clockwise direction with respect to the disk drive base. This resistance depends upon the magnetic attractive force between the two small magnets and the magnetically attractive component molded into the actuator.

The impact rebound crash stop helps increase rotary shock performance in the counterclockwise direction with respect to the disk drive base. The impact response crash stop is preferably made from plastic, preferably from an ultem plastic material. The actuator fan tail is preferably includes a plastic overmold made of vectra.

The elastic coefficient between the plastic impact response crash stop and the plastic overmold actuator fantail is less than one, preferably about 0.6. The elastic coefficient being less than one contributes to very minimal rebound effect from impact between the actuator fantail and the impact rebound crash stop. The loss of high energy during the impact also significantly reduces the chance of sudden impact rebound motion. This reduction in the chance of sudden impact rebound motion, combined with the reduced energy of any sudden impact rebound motion, both contribute to high rotary shock resistance in the counterclockwise direction with respect to the disk drive base.

The latch bias tab 210 is molded into the latch mechanism and supports the latch opening its arm automatically when the actuator is controlled to move out in a desirable speed. The latch opens its arm based upon the attractive force generated on the latch bias tab 210 by the voice coil 32 magnet. The latch bias tab 210 is preferably composed of a magnetically attractive steel compound preferably SUS 430 steel.

The invention secures read-write head parking through rotational shocks of 25,000 to 30,000 radians/sec^2 of up to two milliseconds duration. Note that the contemporary industry standard is support for up to 20,000 radians/sec^2.

Depending upon the small magnets, the performance can protect read-write head parking under even more severe conditions. The small magnets preferably have magnetic strengths of 48 MGO and are preferably 1.5 millimeters thick and 3 millimeters by 4 millimeters wide.

The preceding embodiments have been provided by way of example and are not meant to constrain the scope of the following claims.

What is claimed is:

1. A method for parking a disk drive, comprising:
   disposing a proximity latch mechanism (210-218) at a fantail of an actuator (30) such that said latch mechanism will engage and stop actuator rotation when a slider head (60) reaches a parking ramp (120);
   placing magnets (220) to draw said actuator (30) to self rotate into a parking position that engages said proximity latch mechanism (210-218);
   allowing said proximity latch mechanism (210-218) to engage said actuator by rotating said latch mechanism on a pivot (218) to close a first gap between a latch pusher arm (212) on said latch mechanism and an actuator pusher site (214) on said actuator, and then to close a second gap between a latch crash stop arm (216) on said latch mechanism and an actuator crash stop site (226) on said actuator while said first gap remains closed;
   providing for said proximity latch mechanism (210-218) to disengage said actuator by rotating said latch mechanism on said pivot (218) due to a voltage being applied in a nearby actuator voice coil (32) of said actuator that then magnetically acts on a latch bias tab (210) of said latch mechanism, and thus opens the second gap between said crash stop arm (216) and said crash stop site (226) when said pusher arm (212) presses away on said actuator pusher site (214).

2. The method of claim 1, wherein:
the step of placing is such that said magnets (220) are selected to have magnetic strengths of about 48 MGO.

3. The method of claim 1, wherein:
the step of allowing is such that said crash stop arm (216) and said crash stop site (226) are fabricated with plastic so as to have an elastic coefficient of about 0.6, and thereby absorb some impacts and reduce rebounding.

4. The method of claim 1, wherein:
the step of providing for is such that said latch bias tab (210) includes a magnetic steel compound equivalent to SUS 430 steel.

5. A method for parking a disk drive uses magnets (220) to passively pull an actuator (30) into a parking position whenever a voice coil (32) of said actuator is not actively positioning said actuator elsewhere, and said magnets (220) draw said actuator (30) into a latch mechanism (210-218) on a pivot (218), said latch mechanism including a pusher arm (212) and a crash stop arm (216), wherein, when said actuator is engaging said latch mechanism, said pusher arm (212) will press a pusher site (214) on said actuator, causing said latch mechanism to rotate said crash stop arm (216) into said crash stop site (226) on said actuator, wherein, said magnets (220) will hold this engagement, and rotational jarring of said disk drive in a direction of unparking said actuator will be resisted magnetically by magnets (220) to 25 k-30 k radians per second squared, and any rotational jarring of said disk drive in a parking direction of said actuator will be positively stopped by crash stop arm (216) in contact against said crash stop site (226).

6. The method of claim 5, further comprising disengaging said latch mechanism using magnetic fields from said voice coil (32) being energized to pull on a latch bias tab (210) of said latch mechanism and cause said latch mechanism to rotate, and said crash stop arm (216) separates from said crash stop site (226) when said pusher arm (212) presses away said pusher site (214) on said actuator, wherein such leverage helps said voice coil (32) position said actuator (30) to access storage data.

* * * * *